United States Patent
Dai et al.

(10) Patent No.: US 11,797,130 B2
(45) Date of Patent: Oct. 24, 2023

(54) FINGER TOUCH DETECTING METHOD BASED ON FINGER DISTRIBUTION AREA DETECTED ON TOUCH DETECTION AREA AND HANDHELD DEVICE

(71) Applicant: HTC Corporation, Taoyuan (TW)

(72) Inventors: Chen-Si Dai, Taoyuan (TW); Wei-Chih Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 337 days.

(21) Appl. No.: 17/202,377

(22) Filed: Mar. 16, 2021

(65) Prior Publication Data
US 2022/0300140 A1  Sep. 22, 2022

(51) Int. Cl.
*G06F 3/041* (2006.01)
*G06F 3/0488* (2022.01)

(52) U.S. Cl.
CPC ........ *G06F 3/04186* (2019.05); *G06F 3/0488* (2013.01); *G06F 2203/04106* (2013.01)

(58) Field of Classification Search
CPC ............................ G06F 3/04186; G06F 3/0488
See application file for complete search history.

(56) References Cited

U.S. PATENT DOCUMENTS

| | | | | |
|---|---|---|---|---|
| 9,292,122 | B1* | 3/2016 | Maharyta | G06F 3/0445 |
| 10,795,438 | B2* | 10/2020 | Wang | G06F 3/014 |
| 11,275,456 | B2* | 3/2022 | Xie | G06F 3/038 |
| 11,287,886 | B1* | 3/2022 | Harb | G06T 7/20 |
| 11,360,558 | B2* | 6/2022 | Wang | G06T 19/006 |
| 11,360,587 | B1* | 6/2022 | Wang | G06F 3/016 |
| 2003/0214481 | A1* | 11/2003 | Xiong | G06F 3/017 345/157 |
| 2019/0113986 | A1* | 4/2019 | Bikumala | G06F 3/017 |
| 2019/0302865 | A1* | 10/2019 | Liepold | H03K 17/962 |
| 2021/0178251 | A1* | 6/2021 | Nietfeld | A63F 13/42 |
| 2021/0397321 | A1* | 12/2021 | Meng | G06F 3/04164 |

* cited by examiner

Primary Examiner — Chun-Nan Lin
(74) Attorney, Agent, or Firm — JCIPRNET

(57) ABSTRACT

The embodiments of the disclosure provide a finger touch detecting method and a handheld device. The method includes: detecting a finger distribution area touched by a plurality of fingers on a touch detection area, wherein the touch detection area comprises a plurality of touch sensors, and the finger distribution area includes a plurality of specific sensors of the touch sensors; distributing a predetermined data size over the specific sensors, wherein each specific sensor is distributed with a corresponding bit size; obtaining a raw data detected by each of the specific sensors; quantizing the raw data of each of the specific sensors based on the corresponding bit size; and providing the quantized raw data of each of the specific sensors.

20 Claims, 2 Drawing Sheets

FINGER TOUCH DETECTING METHOD BASED ON FINGER DISTRIBUTION AREA DETECTED ON TOUCH DETECTION AREA AND HANDHELD DEVICE

BACKGROUND

1. Field of the Invention

The disclosure generally relates to a touch detection technique, in particular, to a finger touch detecting method and a handheld device.

2. Description of Related Art

In current virtual reality (VR) systems, the user may use the VR controller(s) thereof to perform various inputs to the VR system. In one scenario, the VR controller may be able to detect the holding gesture that characterizes how the user holds the VR controller and transmit the detected data to the host or the head mounted display (HMD) of the VR system.

However, the size of the detected data related to the holding gesture may be too large to be transmitted to the host and/or the HMD.

SUMMARY OF THE INVENTION

Accordingly, the disclosure is directed to a finger touch detecting method and a handheld device, which may be used to solve the above technical problems.

The embodiments of the disclosure provide a finger touch detecting method, adapted to a handheld device having a touch detection area. The method includes: detecting a finger distribution area touched by a plurality of fingers on the touch detection area, wherein the touch detection area comprises a plurality of touch sensors, and the finger distribution area includes a plurality of specific sensors of the touch sensors; distributing a predetermined data size over the specific sensors, wherein each specific sensor is distributed with a corresponding bit size; obtaining a raw data detected by each of the specific sensors; quantizing the raw data of each of the specific sensors based on the corresponding bit size; and providing the quantized raw data of each of the specific sensors.

The embodiments of the disclosure provide a handheld device including a touch detection area and a processor. The touch detection area includes a plurality of touch sensors. The processor is coupled with the touch sensors in the touch detection area and performs the following steps: detecting a finger distribution area touched by a plurality of fingers on the touch detection area, wherein the finger distribution area includes a plurality of specific sensors of the touch sensors; distributing a predetermined data size over the specific sensors, wherein each specific sensor is distributed with a corresponding bit size; obtaining a raw data detected by each of the specific sensors; quantizing the raw data of each of the specific sensors based on the corresponding bit size; and providing the quantized raw data of each of the specific sensors.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
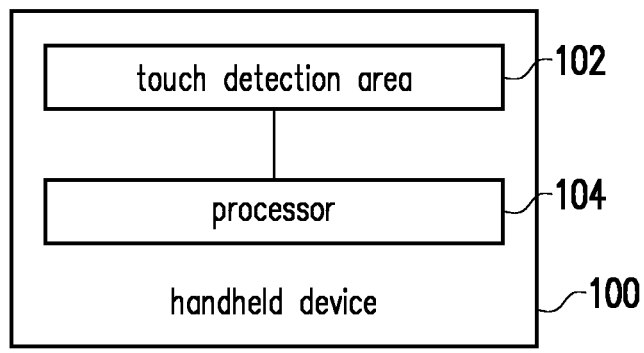
FIG. 1 shows a functional diagram of a handheld device according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a functional diagram of a handheld device according to an exemplary embodiment of the disclosure. In various embodiments, the handheld device 100 may be any electronic devices that could be hold by a user and detect the holding gesture (e.g., grabbing, open handed, etc.) of the user. In the embodiments of the disclosure, the handheld device 100 may be a VR controller of a VR system, wherein the VR system may include other elements, such as an HMD, a position tracking element, a host, but the disclosure is not limited thereto. In addition, the handheld device 100 may be designed with a strap for wrapping the user's hand with the body of the handheld device 100, such that the handheld device 100 would stay in the user's hand even when the user opens his/her hand, but the disclosure is not limited thereto.

In FIG. 1, the handheld device 100 includes a touch detection area 102 and a processor 104. In one embodiment, the touch detection area 102 may include a plurality of touch sensors. Each of the touch sensors may be implemented as a capacitor sensor whose capacitance would vary in response to the touch of the user, but the disclosure is not limited thereto.

The processor 104 may be coupled with the touch sensors in the touch detection area 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access some software modules or program codes to implement the finger touch detecting method provided in the disclosure, which would be further discussed in the following.

Figure 2:
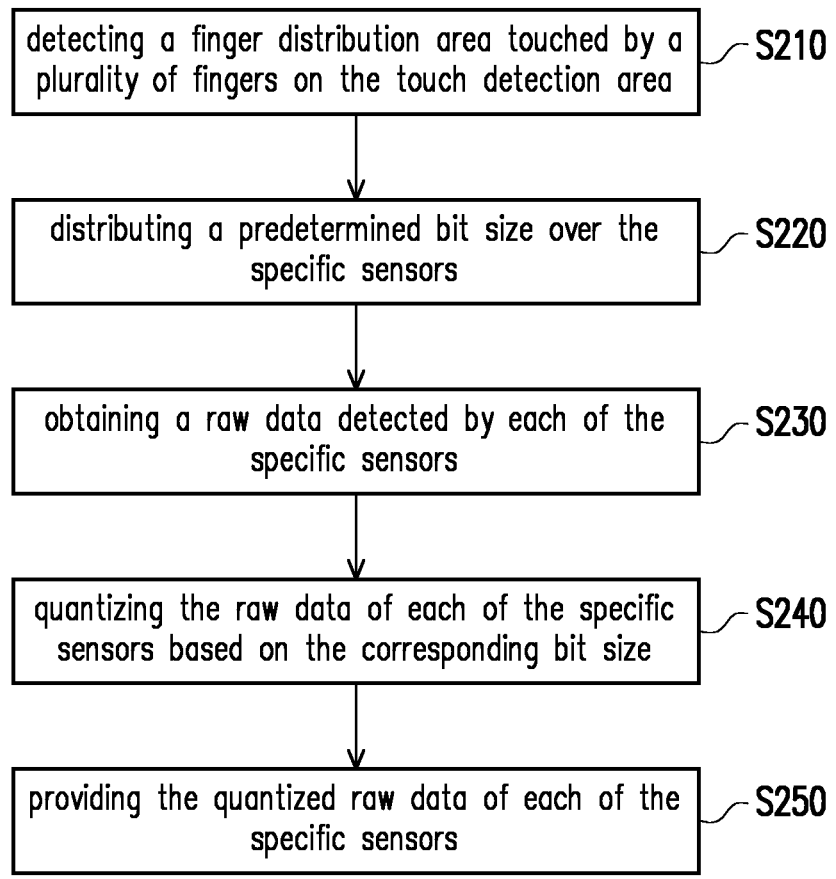
FIG. 2 shows a flow chart of the finger touch detecting method according to an embodiment of the disclosure.

See FIG. 2, which shows a flow chart of the finger touch detecting method according to an embodiment of the disclosure. The method of this embodiment may be executed by the handheld device 100 in FIG. 1, and the details of each step in FIG. 2 will be described below with the components shown in FIG. 1. In addition, for better understanding the concept of the disclosure, FIG. 3 would be used as an example for discussion, but the disclosure is not limited thereto.

Figure 3:
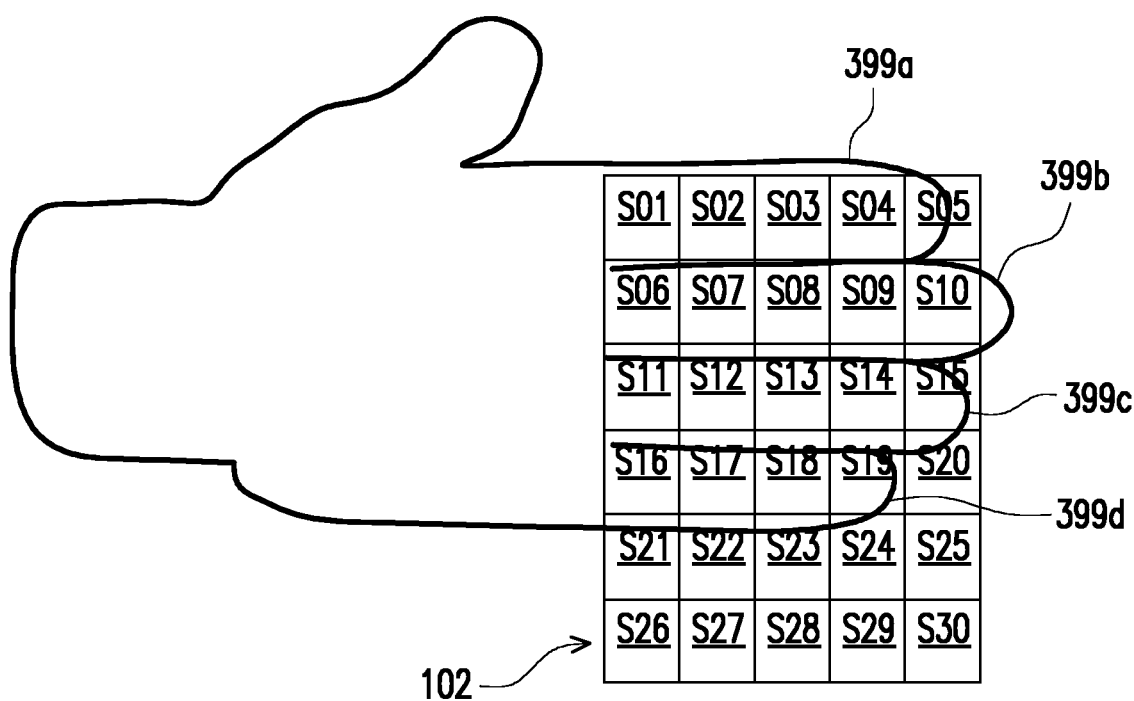
FIG. 3 shows an application scenario according to an exemplary embodiment of the disclosure.

See FIG. 3, which shows an application scenario according to an exemplary embodiment of the disclosure. In FIG. 3, the touch detection area 102 may be disposed on the holding portion of the handheld device 100 and include touch sensors S01-S30, wherein each box in the touch detection 102 corresponds to one of the touch sensors S01-S30. Noted that the touch detection area 102 is illustrated in a plane view for better understanding, but in the embodiments of the disclosure, the touch detection area 102 may be disposed to surround the holding portion of the handheld device 100.

In the embodiments of the disclosure, the raw data detected by each of the touch sensors S01-S30 may have a size of 2 bytes. In this case, if all of the raw data of each touch sensors S01-S30 are transmitted to the HMD, the overall data size would be 60 bytes.

However, in conventional transmission between the handheld device 100 and the HMD, the payload size of the RF signal is only 12 bytes (i.e., 96 bits), which is not enough for transmitting all of the raw data detected by each touch sensors S01-S30.

Accordingly, the method of the disclosure may be used to reduce the data size transmitted from the handheld device 100 to the HMD, and detailed discussions would be provided in the following.

In step S210, the processor 104 may detect a finger distribution area touched by a plurality of fingers 399a-399d on the touch detection area 102, wherein the finger distribution area may include/cover a plurality of specific sensors of the touch sensors S01-S30.

In FIG. 3, it is assumed that the finger distribution area of the fingers 399a-399d covers the touch sensors S01-S19, i.e., the fingers 399a-399d touch the touch sensors S01-S19. In this case, the specific sensors in the finger distribution area may be defined as the touch sensors S01-S19, but the disclosure is not limited thereto.

In some embodiments, step S210 may be performed in a calibration phase of the VR system. Specifically, in the calibration phase, the VR system may ask the user to hold the handheld device 100 in a regular way, such that the processor 104 may detect which part of the touch detection area 102 would be more likely to be used/touched by the user, e.g., the finger distribution area shown in FIG. 3.

From another perspective, the processor 104 may also detect that which part of the touch detection area 102 would be less likely to be used/touched by the user, e.g., the untouched area formed by the touch sensors S20-S30. In this way, the raw data detected by the touch sensors S20-S30 may be needless to be transmitted to the HMD, which may improve the transmission efficiency, but the disclosure is not limited thereto.

After obtaining the specific sensors (i.e., the touch sensors S01-S19) in the finger distribution area, the processor 104 may perform step S220 to distribute a predetermined data size over the specific sensors, wherein each specific sensor is distributed/allocated/assigned with a corresponding bit size.

In one embodiment, the predetermined data size may be assumed to be the payload size of the RF signal between the handheld device 100 and the HMD, i.e., 96 bits, but the disclosure is not limited to.

In one embodiment, the processor 104 may obtain a plurality of first type sensors from the specific sensors (i.e., the touch sensors S01-S19), wherein the first type sensors may correspond to a plurality of finger bases of the user of the handheld device 100. For example, the processor 104 may firstly find the rows touched by the fingers 399a-399d and define the leftmost (i.e., the side nearest to the palm) touch sensor on each touched row as the first type sensors.

In FIG. 3, the first type sensors may be assumed to be the touch sensors S01, S06, S11, and S16, but the disclosure is not limited thereto.

In addition, the processor 104 may obtain a plurality of second type sensors from the specific sensors, wherein the second type sensors may correspond to a plurality of fingertips of the user of the handheld device 100. For example, the processor 104 may define the rightmost (i.e., the side farthest from the palm) touch sensor on each touched row as the second type sensors. In FIG. 3, the second type sensors may be assumed to be the touch sensors S05, S10, S15, and S19, but the disclosure is not limited thereto.

With the first type sensors and the second type sensors, the processor 104 may assign a first bit size to each of the first type sensors and assign a second bit size to each of the second type sensors, wherein the first bit size may be larger than the second bit size.

Specifically, when the user holds the handheld device 100, a slight variation occurred at the finger bases may represent a completely different holding gesture. Therefore, the first bit size assigned to each of the first type sensor needs to be large enough to finely characterize the statuses of the finger bases. For example, the first bit size may be 8 bits or other desired values of the designer, but the disclosure is not limited thereto.

In some embodiments, the first bit size of each first type sensors may be different. For example, the first bit sizes of the touch sensors S10 and S06 may be 8 bits, but the first bit sizes of the touch sensors S11 and S16 may be 7 bits, but the disclosure is not limited thereto.

On the contrary, when the user holds the handheld device 100, the variations occurred at the fingertips would generally only include two conditions, i.e., whether the user is fully holding the handheld device 100 or not. Therefore, the second bit size assigned to each of the second type sensor may be small to characterize the statuses of the fingertips. For example, the second bit size may be 1 bit or other desired values of the designer, but the disclosure is not limited thereto.

In addition, the processor 104 may obtain a plurality of third type sensors from the specific sensors (i.e., the touch sensors S01-S19), wherein the third type sensor may correspond to a plurality of middle sections of the fingers 399a-399d of the user of the handheld device 100. For example, the processor 104 may define the specific sensors not belonging to the first/second type sensors as the third type sensors. In FIG. 3, the third type sensors may be assumed to be the touch sensors S02-S04, S07-S09, S12-S14, and S17-S18, but the disclosure is not limited thereto. Next, the processor 104 may assign a third bit size to each of the third type sensors, wherein the third bit size may be between the first bit size and the second bit size.

Specifically, when the user holds the handheld device 100, the variations occurred at the middle sections of the fingers 399a-399d may be more important than the variations at the fingertips but less important than the variations at the finger bases. Therefore, the third bit size between the first bit size and the second bit size may be good enough to characterize the statuses of the middle sections of the fingers 399a-399d, but the disclosure is not limited thereto. For example, the third bit size may be 2 to 7 bits or other desired values of the designer, but the disclosure is not limited thereto.

In one embodiment, the processor 104 may firstly distribute the predetermined data size over the first type sensors and the second type sensors and distribute the rest of the predetermined data size over the third type sensors.

For example, it is assumed that the first bit size of each of the first type sensors is 8 bits and the second bit size of each of the second type sensor is 1 bit. In this case, the processor 104 may distribute 36 bits of the predetermined data size (i.e., 96 bits) over the first type sensors and the second type sensors in FIG. 3. Next, the processor 104 may distribute the remaining 60 bits of the predetermined data size over the third type sensors.

In one embodiment, the processor 104 may uniformly distribute the rest of the predetermined data size over the third type sensors. In other embodiments, the processor 104 may distribute the rest of the predetermined data size over the third type sensors in other ways.

For example, the processor 104 may find a plurality of fourth type sensors and a plurality of fifth type sensors from the third type sensors, wherein the fourth type sensors may correspond to a plurality of knuckles of the user of the handheld device 100, and the fifth type sensors may be the specific sensors not belonging to the first type sensors, the second type sensors, and the fourth type sensors.

In one embodiment, the processor 104 may firstly estimate the locations of the knuckles of the fingers 399a-399d and define the touch sensors corresponding to the locations of the knuckles as the fourth type sensors. Specifically, since there is a regular principle of where a knuckle may locate in a finger, once the processor 104 determines the first type sensor and the second type sensor on the same row, the processor 104 may roughly determine that which touch sensor on the same row may be more likely to correspond to a knuckle.

For example, with the touch sensors S01 and S05, the processor 104 may determine the touch sensors S02 and S04 as two of the fourth type sensors because the touch sensors S02 and S04 are more likely to correspond to the knuckles. In this case, the processor 104 may determine the touch sensor S03 as one of the fifth type sensors, but the disclosure is not limited thereto. For another example, with the touch sensors S06 and S10, the processor 104 may determine the touch sensors S07 and S09 as two of the fourth type sensors because the touch sensors S07 and S09 are more likely to correspond to the knuckles. In this case, the processor 104 may determine the touch sensor S08 as one of the fifth type sensors, but the disclosure is not limited thereto.

In one embodiment, the third bit size of each of the fifth type sensors may be smaller than the third bit size of each fourth type sensors. Specifically, when the user holds the handheld device 100, the variations occurred at the knuckles of the fingers 399a-399d may be more important than the variations at the finger areas corresponding to the fifth type sensors. Therefore, the third bit size assigned to each of the fourth type sensor may be larger to better characterize the statuses of the knuckles, but the disclosure is not limited thereto.

After distributing the predetermined data size, the processor 104 may perform step S230 to obtain a raw data (e.g., capacitance value) detected by each of the specific sensors (i.e., the touch sensor S01-S19). As mentioned in the above, the size of the raw data of each specific sensor may be 2 bytes, but the disclosure is not limited thereto.

Next, in step S240, the processor 104 may quantize the raw data of each of the specific sensors (i.e., the touch sensor S01-S19) based on the corresponding bit size. For example, if the first bit size of the touch sensor S01 is assigned to be 8 bits, the raw data (in 2 bytes) detected by the touch sensor S01 would be quantized as a data with 8 bits. For another example, if the second bit size of the touch sensor S05 is assigned to be 1 bit, the raw data (in 2 bytes) detected by the touch sensor S05 would be quantized as a data with 1 bit. In addition, if the third bit size of the touch sensor S03 is assigned to be 5 bits, the raw data (in 2 bytes) detected by the touch sensor S03 would be quantized as a data with 5 bits.

In this case, since the predetermined data size are distributed over the specific sensors (i.e., the touch sensors S01-S19), the overall size of the quantized raw data of each of the specific sensors may be equal to the predetermined data size (i.e., 96 bits), but the disclosure is not limited thereto.

Next, in step S250, the processor 104 may provide the quantized raw data of each of the specific sensors (i.e., the touch sensors S01-S19). In one embodiment, the processor 104 may transmit the quantized raw data of each of the specific sensors to the HMD and/or the host (e.g. PC) via wired (e.g. USB) or wireless (e.g. RF) path, such that the HMD and/or the host may obtain the holding gesture of the user and accordingly change the visual content provided by the VR system.

As could be observed in the above, the method of the disclosure may reduce the overall data size corresponding to the holding gesture of the user, such that the transmission efficiency between the handheld device 100 and the HMD (or the host) may be improved.

In other embodiments, after obtaining the untouched area formed by the touch sensors S20-S30, the processor 104 may further define the touch sensors S20-S30 as unused sensors and neglect the raw data detected by the unused sensors. Accordingly, the computation complexity of the handheld device 100 may be further reduced.

In some embodiments, the assigned bit size of each specific sensor may be dynamically adjusted based on various application scenario.

In one embodiment, the processor 104 may monitor the usage frequency of each third type sensor and determine whether the usage frequency of any of the third type sensors is lower than a first threshold (which may be determined based on the requirements of the designer). In the embodiment, assuming that there is a part of the third type sensors has a usage frequency lower than the first threshold, and another part of the third type sensors has a usage frequency higher than the first threshold. In this case, in response to determining that the usage frequency of the part of the third type sensors is lower than the first threshold, the processor 104 may reduce the third bit size of the part of the third type sensors and increase the third bit size of another part of the third type sensors, wherein the sum of the bit size of each specific sensor may still be equal to the predetermined data size, but the disclosure is not limited thereto.

In detail, different users with the same hand size may hold the handheld device 100 in different ways while interacting with the VR environment provided by the VR system. For example, one user may prefer tightly grabbing the handheld device 100, such that all fingers of this user may completely touch the third type sensors. However, another user may prefer gently hold the handheld device 100, such that some part of third type sensors may not be touched by the fingers of this user.

Therefore, for the less used part of the third type sensors, the processor 104 may reduce the third bit size of the less used part of the third type sensors since the less used part are allowed to be less accurate. On the other hand, since the another part (i.e., the more used part) of the third type sensors are adjusted to have higher third bit size, the another part of the third type sensor may better characterize the statuses of finger touching, but the disclosure is not limited thereto.

In other embodiments, in some cases, the user of the handheld device 100 may need to change the ways of holding the handheld device 100 in response to different visual contents provided by the VR system. For example, some visual contents may need the user to tightly grab the handheld device 100, such that all fingers of the user may completely touch the third type sensors. However, other visual contents may need the user to gently hold the handheld device 100, such that some part of third type sensors may not be touched by the fingers of this user.

Therefore, the processor 104 may obtain the visual content provided by the VR system and adjust the third bit size of each of the third type sensors according to the visual content. For example, based on the visual content, the processor 104 may determine which part of the third type sensors may be less used, and the processor 104 may reduce the third bit size of the less used part of the third type sensors. On the other hand, the processor 104 may correspondingly increase the third bit size of the more used part of the third type sensors, wherein the sum of the bit size of each specific sensor may still be equal to the predetermined data size, but the disclosure is not limited thereto.

That is, the processor 104 may reduce the third bit size of the less used part of the third type sensors since the less used part are allowed to be less accurate. On the other hand, the more used part of the third type sensor may better characterize the statuses of finger touching, but the disclosure is not limited thereto.

In summary, the embodiments of the disclosure may detect the finger distribution area on the touch detection area and distribute the predetermined data size over the specific sensors within the finger distribution. After obtaining the raw data detected by each specific sensor, the embodiments of the disclosure quantize the raw data of each specific sensor based on the corresponding bit size and provide the quantized raw data of each specific sensor. Accordingly, the embodiments of the disclosure may reduce the overall data size corresponding to the holding gesture of the user, such that the transmission efficiency between the handheld device 100 and the HMD (or the host) may be improved.

In addition, the embodiments of the disclosure provide several ways to distribute the predetermined data size over the specific sensors within the finger distribution area to better characterize the statuses of finger touching on each specific sensor.

Besides, the embodiments of the disclosure also provide mechanisms for dynamically adjusting the bit size of each specific sensor based on various application scenario.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A finger touch detecting method, adapted to a handheld device having a touch detection area, comprising:
   detecting a finger distribution area touched by a plurality of fingers on the touch detection area, wherein the touch detection area comprises a plurality of touch sensors, and the finger distribution area comprises a plurality of specific sensors among the plurality of touch sensors;
   distributing a predetermined data size over the plurality of specific sensors, wherein each of the plurality of specific sensor is distributed with a corresponding bit size;
   obtaining a raw data detected by each of the plurality of specific sensors;
   quantizing the raw data of each of the plurality of specific sensors based on the corresponding bit size; and
   providing the quantized raw data of each of the plurality of specific sensors.

2. The method according to claim 1, wherein a sum of the bit size of each of the plurality of specific sensor is equal to the predetermined data size.

3. The method according to claim 1, wherein the step of distributing the predetermined data size over the plurality of specific sensors comprises:
   obtaining a plurality of first type sensors from the plurality of specific sensors;
   obtaining a plurality of second type sensors from the plurality of specific sensors; and
   assigning a first bit size to each of the plurality of first type sensors and assigning a second bit size to each of the plurality of second type sensors, wherein the first bit size is larger than the second bit size.

4. The method according to claim 3, further comprising:
   obtaining a plurality of third type sensors from the plurality of specific sensors; and
   assigning a third bit size to each of the plurality of third type sensors, wherein the third bit size is between the first bit size and the second bit size.

5. The method according to claim 4, wherein the plurality of third type sensors comprise a plurality of fourth type sensors and a plurality of fifth type sensors, and the third bit size of each of the plurality of fifth type sensors is smaller than the third bit size of each of the plurality of fourth type sensors.

6. The method according to claim 5, wherein the plurality of first type sensors correspond to a plurality of finger bases of a user of the handheld device, the plurality of second type sensors correspond to a plurality of fingertips of the user of the handheld device, the plurality of third type sensors correspond to a plurality of middle sections of the fingers of the user of the handheld device, the plurality of fourth type sensors correspond to a plurality of knuckles of the user of the handheld device, and the plurality of fifth type sensors are the specific sensors not belonging to the first type sensors, the second type sensors, and the fourth type sensors.

7. The method according to claim 4, further comprising:
   in response to determining that a usage frequency of a part of the plurality of third type sensors is lower than a first threshold, reducing the third bit size of the part of the plurality of third type sensors and increasing the third bit size of another part of the plurality of third type sensors.

8. The method according to claim 4, wherein the handheld device is a virtual reality controller of a virtual reality system, and the method further comprises:
   obtaining a visual content provided by the virtual reality system; and
   adjusting the third bit size of each of the plurality of third type sensors according to the visual content.

9. The method according to claim 1, wherein the handheld device is a virtual reality controller of a virtual reality system, the virtual reality system further comprises a head-mounted display, and the step of providing the quantized raw data of each of the plurality of specific sensors comprises:
   transmitting the quantized raw data of each of the plurality of specific sensors to the head-mounted display.

10. The method according to claim 1, further comprising:
obtaining an untouched area on the touch detection area, wherein the untouched area comprises a plurality of unused sensors among the plurality of touch sensors; and neglecting the raw data detected by the plurality of unused sensors.

11. A handheld device, comprising:
a touch detection area, comprising a plurality of touch sensors; and
a processor, coupled with the touch sensors in the touch detection area, wherein:
the processor detects a finger distribution area touched by a plurality of fingers on the touch detection area, wherein the finger distribution area comprises a plurality of specific sensors among the plurality of touch sensors;
the processor distributes a predetermined data size over the plurality of specific sensors, wherein each of the plurality of specific sensor is distributed with a corresponding bit size;
the processor obtains a raw data detected by each of the plurality of specific sensors;
the processor quantizes the raw data of each of the plurality of specific sensors based on the corresponding bit size; and
the processor provides the quantized raw data of each of the plurality of specific sensors.

12. The handheld device according to claim 11, wherein a sum of the bit size of each of the plurality of specific sensor is equal to the predetermined data size.

13. The handheld device according to claim 11, wherein:
the processor obtains a plurality of first type sensors from the plurality of specific sensors;
the processor obtains a plurality of second type sensors from the plurality of specific sensors; and
the processor assigns a first bit size to each of the plurality of first type sensors and assigning a second bit size to each of the plurality of second type sensors, wherein the first bit size is larger than the second bit size.

14. The handheld device according to claim 13, wherein:
the processor obtains a plurality of third type sensors from the plurality of specific sensors; and
the processor assigns a third bit size to each of the plurality of third type sensors, wherein the third bit size is between the first bit size and the second bit size.

15. The handheld device according to claim 14, wherein the plurality of third type sensors comprise a plurality of fourth type sensors and a plurality of fifth type sensors, and the third bit size of each of the plurality of fifth type sensors is smaller than the third bit size of each of the plurality of fourth type sensors.

16. The handheld device according to claim 15, wherein the plurality of first type sensors correspond to a plurality of finger bases of a user of the handheld device, the plurality of second type sensors correspond to a plurality of fingertips of the user of the handheld device, the plurality of third type sensors correspond to a plurality of middle sections of the fingers of the user of the handheld device, the plurality of fourth type sensors correspond to a plurality of knuckles of the user of the handheld device, and the plurality of fifth type sensors are the specific sensors not belonging to the first type sensors, the second type sensors, and the fourth type sensors.

17. The handheld device according to claim 14, wherein:
in response to determining that a usage frequency of a part of the plurality of third type sensors is lower than a first threshold, the processor reduces the third bit size of the part of the plurality of third type sensors and increasing the third bit size of another part of the plurality of third type sensors.

18. The handheld device according to claim 14, wherein the handheld device is a virtual reality controller of a virtual reality system;
wherein the processor obtains a visual content provided by the virtual reality system; and
the processor adjusts the third bit size of each of the plurality of third type sensors according to the visual content.

19. The handheld device according to claim 11, wherein the handheld device is a virtual reality controller of a virtual reality system, the virtual reality system further comprises a head-mounted display;
wherein the processor transmits the quantized raw data of each of the plurality of specific sensors to the head-mounted display.

20. The handheld device according to claim 11, wherein:
the processor obtains an untouched area on the touch detection area, wherein the untouched area comprises a plurality of unused sensors among the plurality of touch sensors; and
the processor neglects the raw data detected by the plurality of unused sensors.

* * * * *